(12) United States Patent
Hamade et al.

(10) Patent No.: US 10,888,077 B2
(45) Date of Patent: Jan. 12, 2021

(54) POLE-AND-LINE FISHING DEVICE

(71) Applicant: TOWA DENKI SEISAKUSHO CO., LTD., Hakodate (JP)

(72) Inventors: Yuichi Hamade, Hokkaido (JP); Daigo Sawada, Hokkaido (JP); Tomohiro Miki, Hokkaido (JP); Eri Hamade, Hokkaido (JP)

(73) Assignee: TOWA DENKI SEISAKUSHO CO., LTD., Hokkaido (JP)

( * ) Notice: Subject to any disclaimer, the term of this patent is extended or adjusted under 35 U.S.C. 154(b) by 43 days.

(21) Appl. No.: 16/308,441

(22) PCT Filed: May 15, 2017

(86) PCT No.: PCT/JP2017/018242
§ 371 (c)(1),
(2) Date: Dec. 7, 2018

(87) PCT Pub. No.: WO2017/217164
PCT Pub. Date: Dec. 21, 2017

(65) Prior Publication Data
US 2019/0183103 A1 Jun. 20, 2019

(30) Foreign Application Priority Data
Jun. 13, 2016 (JP) .................................. 2016-116864

(51) Int. Cl.
*A01K 89/01* (2006.01)
*A01K 89/017* (2006.01)
(Continued)

(52) U.S. Cl.
CPC ............ *A01K 89/017* (2013.01); *A01K 89/08* (2013.01); *A01K 91/18* (2013.01); *A01K 97/00* (2013.01)

(58) Field of Classification Search
CPC .. A01K 89/017; A01K 89/0186; A01K 91/18; A01K 79/00; A01K 89/08
See application file for complete search history.

(56) References Cited

U.S. PATENT DOCUMENTS

| 4,586,672 A * | 5/1986 | King ..................... G11B 23/113 156/502 |
| 2012/0103743 A1 * | 5/2012 | Hong .................... F16D 41/063 192/45.1 |

(Continued)

FOREIGN PATENT DOCUMENTS

| JP | H08205725 A | 8/1996 |
| JP | 2006075052 A | 3/2006 |

(Continued)

OTHER PUBLICATIONS

Japanese Office Action dated Oct. 1, 2019 (and English translation thereof) issued in Japanese Application No. 2016-116864.
(Continued)

*Primary Examiner* — Emmanuel M Marcelo
(74) *Attorney, Agent, or Firm* — Holtz, Holtz & Volek PC

(57) ABSTRACT

A pole-and-line fishing device includes a rotary drum, a drive motor, an electromagnetic clutch, an encoder for detecting direction and speed of rotation of the rotary drum, and a control unit for controlling the electromagnetic clutch. The drive motor can rotate the rotary drum in a forward winding direction until a load reaches a transmission torque, and when load exceeds the transmission torque, the drum can rotate in a reverse unwinding direction. In a reverse torque operation region, a winding torque is set to a preset Winding Force 2 Reference Rotation Speed relative to a Winding Force 1, and is changed based on a change of rotation speed of the drum. The ratio of winding torque increase/decrease is determined by a torque rising curve. The winding torque switches to Winding Force 3 to perform (Continued)

a constant torque operation when speed of the drum reaches Winding Force 3 Reference Rotation Speed.

16 Claims, 18 Drawing Sheets

(51) Int. Cl.
*A01K 89/08* (2006.01)
*A01K 97/00* (2006.01)
*A01K 91/18* (2006.01)

(56) References Cited

U.S. PATENT DOCUMENTS

| | | | | |
|---|---|---|---|---|
| 2014/0141880 | A1* | 5/2014 | Munakata | G07F 17/3258 463/31 |
| 2015/0028145 | A1* | 1/2015 | Johnston | B65H 51/10 242/390.8 |
| 2019/0110454 | A1* | 4/2019 | Hamade | F16D 48/06 |
| 2019/0269118 | A1* | 9/2019 | Hamade | A01K 89/017 |

FOREIGN PATENT DOCUMENTS

| | | | | |
|---|---|---|---|---|
| JP | 2007-104978 | * | 4/2007 | ............ A01K 79/00 |
| JP | 4584108 | B2 | 11/2010 | |
| JP | 2014103868 | A | 6/2014 | |
| WO | WO-2019003606 | A1 * | 1/2019 | ............ A01K 79/00 |

OTHER PUBLICATIONS

English translation of JP 4584108 B2.
International Search Report (ISR) dated Aug. 15, 2017 issued in International Application No. PCT/JP2017/018242.
Written Opinion dated Aug. 15, 2017 issued in International Application No. PCT/JP2017/018242.
International Search Report (ISR) dated Aug. 15, 2017 issued in International Application No. PCT/JP2017/018243.
Written Opinion dated Aug. 15, 2017 issued in International Application No. PCT/JP2017/018243.
Related U.S. Appl. No. 16/308,444; Title: "Pole-And-Line Fishing Device"; First Named Inventor: Yuichi Hamade; Date Filed: Dec. 7, 2018.
Japanese Office Action dated Mar. 25, 2020 (and English translation thereof) issued in Japanese Application No. 2016-116864.

* cited by examiner

POLE-AND-LINE FISHING DEVICE

TECHNICAL FIELD

The present invention relates to a pole-and-line fishing device arranged on a boat especially its subject is fish doing communication when they bite into a bait, that is so-called fighting, such as tunny, for quick response to movement of a tunny caught on a fishhook, thereby preventing an inadvertent severance of a fishline and also restricting wild movement while allowing swimming within a certain extent.

BACKGROUND ART

When explaining a tunny as an example of a fish to be caught by pole-and-line fishing, a tunny biting into a bait will get rid of a fishhook. At this time, the tunny will run around in every direction in the sea to do communication, that is so-called fighting with a fisherman, which will often apply an excessive tension to the fishline or sever the fishline in a worst case.

To cope with this problem, in the prior art, a fishline having a greater diameter is used to prevent it from being severed.

Incidentally, the prior art uses a fishline of the order of No. 100 (1.6 mm in outside diameter), No. 200 (2.3 mm in outside diameter), for example.

CITATION LIST

Patent Literature

Patent Document 1: Japanese Laid-Open Publication No. H8-205725
Patent Document 2: Japanese Patent No. 4584108

SUMMARY OF INVENTION

Technical Problem

The above-described prior art involves the following problems.

At first, use of a thick fishline tends to provide unnatural motion of a fishing bait, which would easily be recognized by a tunny having a good dynamic vision. Accordingly, the tunny would not bite at the bait and it is difficult to achieve a good catch, which is one problem.

Moreover, when the tunny caught on the fishhook is left struggling, it would be exhausted to be burnt, which is another problem.

The expression "burnt" means that a tuna's original red color and quality viscosity and water holding property has been deteriorated so that the meat color becomes somewhat white or dark brown. A fish meat in such condition is referred to as "burnt meat", which has been acidified by its lowered pH value, resulting in deterioration and price-down. Some study reports that the burnt meat will denature proteins at a rate of about 300 times at the maximum.

A tunny has a strong muscle and is a speedy swimmer. The operculum has no muscle and, while swimming with its mouth being opened, oxygen contained in water flowing from the mouth to a gill is introduced from the surface of the gill to the inside of the body. In summary, a tunny continues swimming all its life and tends to swim away when caught on a fishhook, which causes a fishline to be pulled with a strong force, so that the body temperature is raised to be burnt. In a word, tuna's burnt meat will stem from increase of a body temperature resulting from the body (muscle) stress.

The present invention has been made based on the above-described points of view and aims at providing a pole-and-line fishing device capable of preventing an inadvertent severance of a fishline by immediately adapting to movement of a tunny caught on a fishhook to thereby surely fish up the tunny or the like. Moreover, its aim is to provide a pole-and-line fishing device capable of restricting wild movement, while allowing swimming within a certain extent.

The conventional solutions for such problems includes, for example, Patent Document 1 and Patent Document 2. The present invention provides further improvement of the inventions disclosed in Patent Document 1 and Patent Document 2.

Incidentally, Patent Document 2 is filed by the applicant of this application.

Solution to Problem

In order to solve the above-described problems, a pole-and-line fishing device according to a first aspect of the present invention includes a rotary drum rotatable forward/reverse in winding and unwinding directions and having a fishline wound therearound, a drive motor for driving the rotary drum, an electromagnetic clutch arranged between the rotary drum and the drive motor such that rotation of the drive motor is transmitted to the rotary drum to rotate the rotary drum forward in the winding direction, until the load reaches a transmission torque, but the rotary drum is allowed to rotate reverse in the unwinding direction when the load exceeds the transmission torque, an encoder for detecting direction and speed of rotation of the rotary drum, and a control unit for controlling the electromagnetic clutch based on a signal from the encoder. The control unit initially executes normal operation with a winding torque equal to Winding Force 1, changes the winding torque to Winding Force 2 which has been determined in relation to Winding Force 1, when the load increases so that rotation speed of the rotary drum reaches a preset Winding Force 2 Reference Rotation Speed, and executes an operation mode (Operation Mode 1) wherein the operation is switched to reverse torque operation wherein the winding torque is increased/decreased in conformity to increase/decrease of rotation speed of the rotary drum.

According to a second aspect of the invention, the ratio of winding torque increase/decrease in the reverse torque operation is determined from Winding Force 2, Winding Force 3 that is a preset maximum torque and Winding Force 3 Reference Rotation Speed at which Winding Force 3 is obtained.

According to a third aspect of the invention, the operation is changed to a constant torque operation wherein the winding torque is set to Winding Force 3, when rotation speed of the rotary drum reaches Winding Force 3 Reference Rotation Speed.

According to a fourth aspect of the invention, Winding Force 2 Reference Rotation Speed is a preset value for the reverse rotation in the unwinding direction.

According to a fifth aspect of the invention, the torque (the torque of Winding Force 2) to be applied immediately after the normal operation is changed to the reverse torque operation is determined to be smaller than the torque of Winding Force 1.

According to a sixth aspect of the invention, Winding Force 2 Reference Rotation Speed is "0 rpm".

According to a seventh aspect of the invention, Winding Force 2 Reference Rotation Speed is a preset value for the forward rotation in the winding direction.

According to an eighth aspect of the invention, the winding torque is fixed to Winding Force 2, after the operation is switched to the reverse torque control and until the rotary drum turns to rotate reverse in the unwinding direction.

According to a ninth aspect of the invention, the rotation of electromagnetic clutch is transmitted through the gear to the rotary drum.

According to a tenth aspect of the invention, the overall fishing device is mounted on the turntable rotatably.

Advantageous Effects of Invention

With the features of the first aspect of the present invention described above, an inadvertent severance of a fishline can be prevented, and it is possible to land the tuna or other fish without fail. In addition, wild movement is restricted, while allowing swimming within a certain extent, which prevents the tuna or other fish meat from being burned. Moreover, because the fishline is prevented from being severed, it becomes possible to use a fishline having a smaller diameter, which improves a catch in the fishing.

With the feature of the second aspect of the invention described above, since the ratio of winding torque increase/decrease in the reverse torque operation is determined from Winding Force 2, Winding Force 3 that is a preset maximum torque and Winding Force 3 Reference Rotation Speed at which Winding Force 3 is obtained, thereby it is possible to set any ratio easily and to set the optimum ratio easily for bigger success in fishing.

With the feature of the third aspect of the invention described above, since the operation is changed to a constant torque operation wherein the winding torque is set to Winding Force 3, when rotation speed of the rotary drum reaches Winding Force 3 Reference Rotation Speed, it is possible to restrict wild movement of the tuna or the like, which enables a smooth landing.

With the feature of the fourth aspect of the invention described above, since Winding Force 2 Reference Rotation Speed is a preset value for the reverse rotation in the unwinding direction, it is possible to determine Winding Force 2 Reference Rotation Speed and the output torque therewith, which enables fine-tuning of torque distribution at the time of switching, thereby preventing an inadvertent severance of the fishline.

With the feature of the fifth aspect of the invention described above, since the torque (the torque of Winding Force 2) to be applied immediately after the normal operation is changed to the reverse torque operation is determined to be smaller than the torque of Winding Force 1, it is possible to moderate the torque at the time when the operation is switched to the reverse torque operation, which prevents an inadvertent severance of the fishline.

With the feature of the sixth aspect of the invention described above, since Winding Force 2 Reference Rotation Speed is "0 rpm", it is possible to prevent an inadvertent severance of the fishline.

With the feature of the seventh aspect of the invention described above, since Winding Force 2 Reference Rotation Speed is a preset value for the forward rotation in the winding direction, it is possible to surely prevent severance of the fishline due to line slack.

With the feature of the eighth aspect of the invention described above, since the winding torque is fixed to Winding Force 2, after the operation is switched to the reverse torque control and until the rotary drum turns to rotate reverse in the unwinding direction, it is possible to surely prevent the fishline from being severed.

With the feature of the ninth aspect of the invention described above, since the rotation of electromagnetic clutch is transmitted through the gear to the rotary drum, it is possible to improve the performance of the transmission of driving force, and more direct operation is realized.

With the feature of the tenth aspect of the invention described above, since the overall fishing device is mounted on the turntable rotatably, it is possible to change the direction freely and easily.

DESCRIPTION OF EMBODIMENTS

Figure 1:
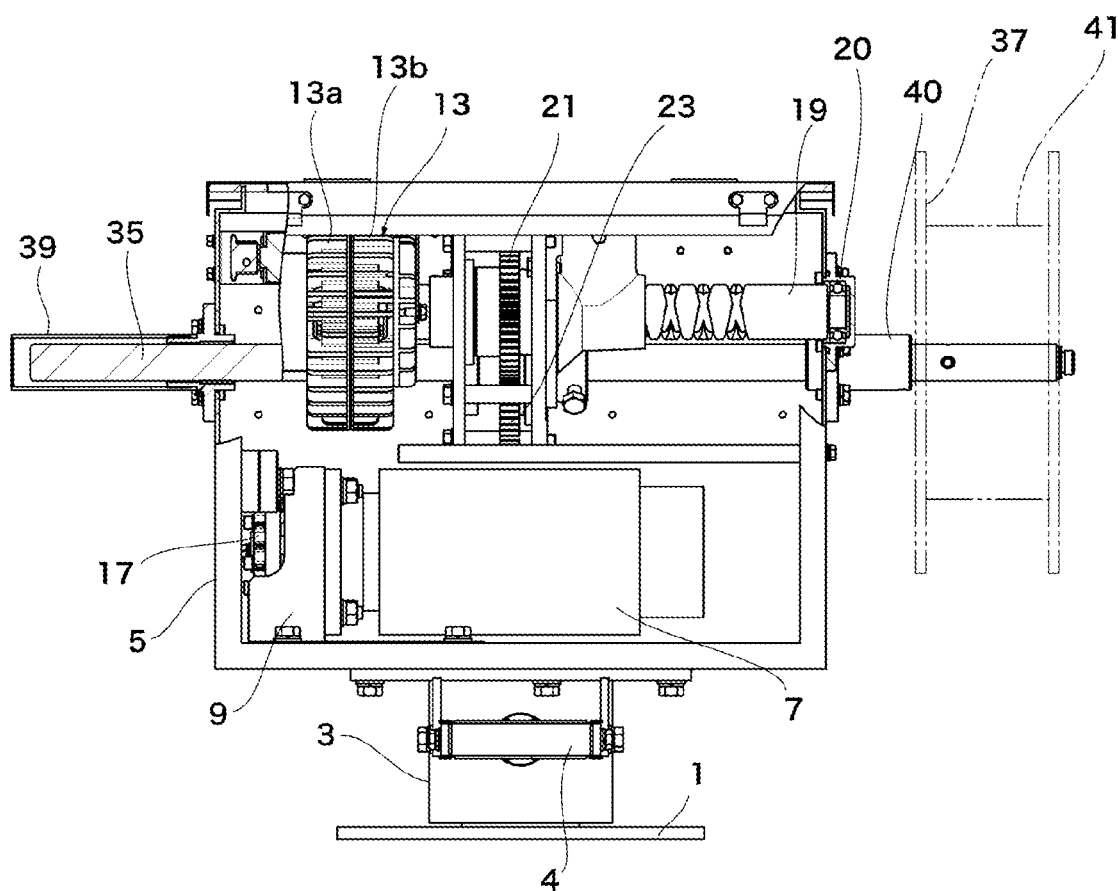
FIG. 1 a view showing an embodiment of the present invention, that is a longitudinal cross-section showing a construction of a pole-and-line fishing device.
Figure 2:
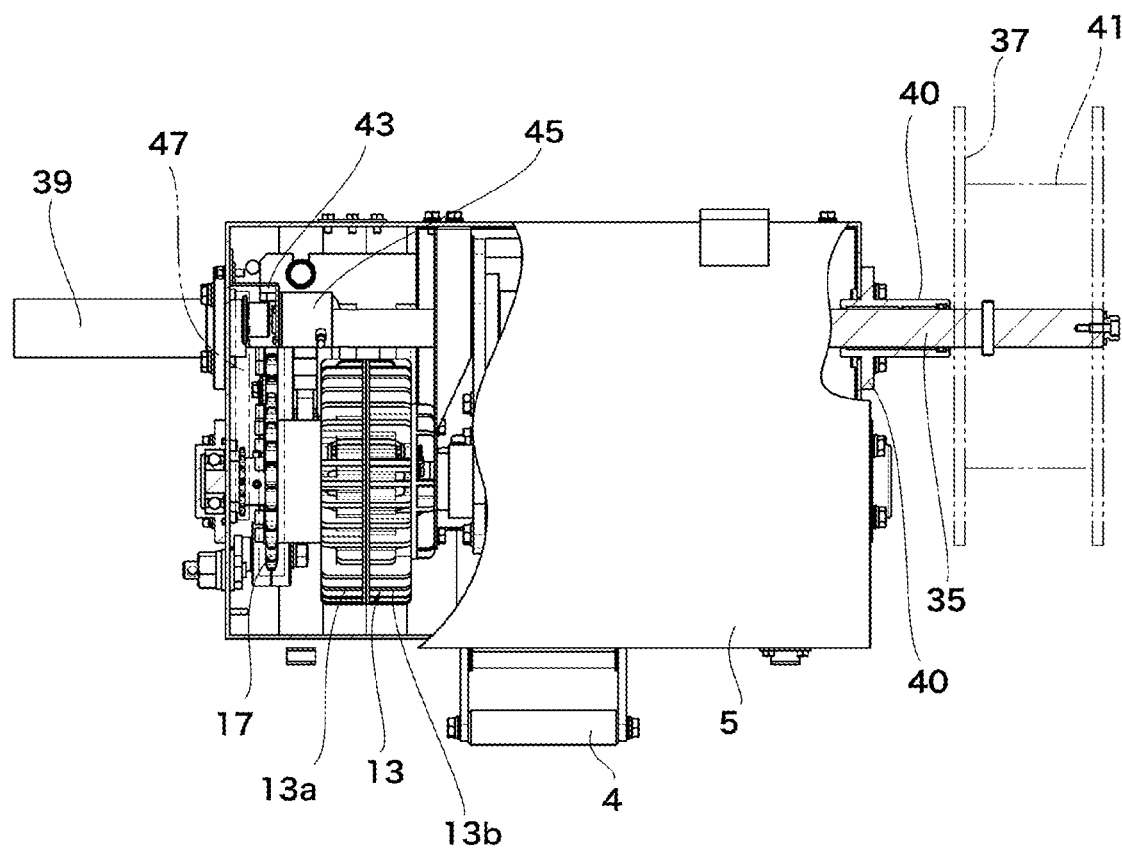
FIG. 2 a view showing the embodiment of the present invention, that is a plan view, partly in broken, showing the construction of the pole-and-line fishing device.
Figure 3:
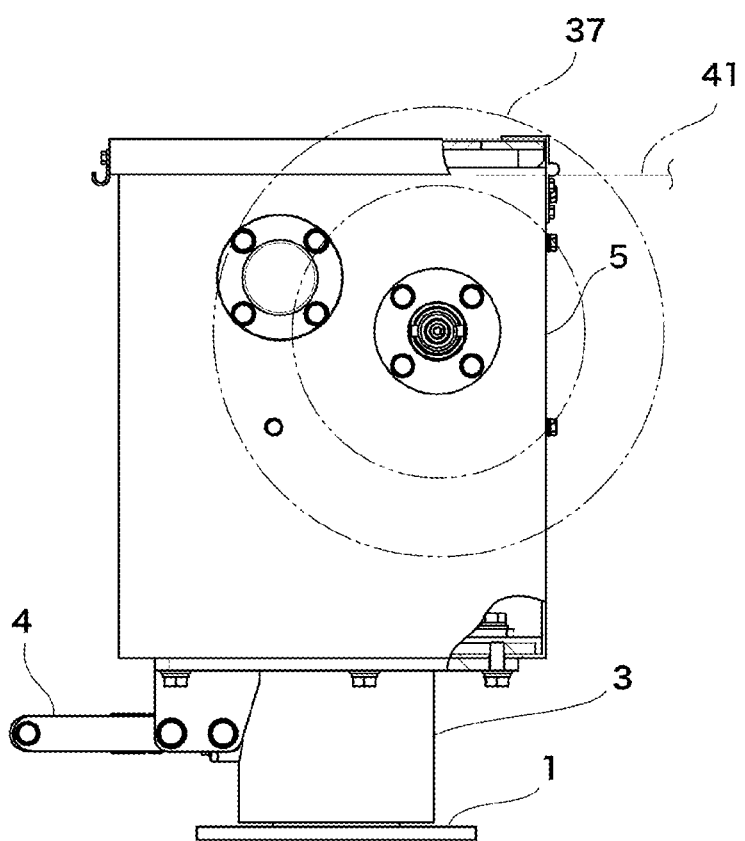
FIG. 3 a view showing the embodiment of the present invention, that is a side elevation showing the pole-and-line fishing device.
Figure 4:
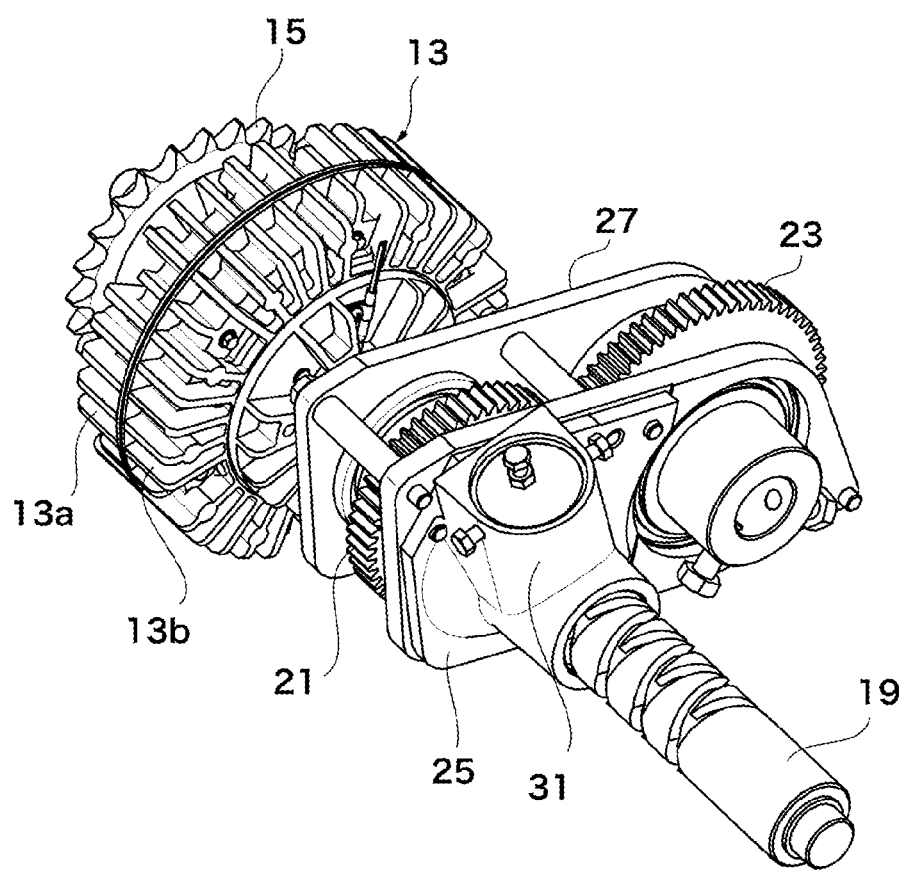
FIG. 4 a view showing the embodiment of the present invention, that is a perspective view showing the construction of a principal part of the pole-and-line fishing device.
Figure 5:
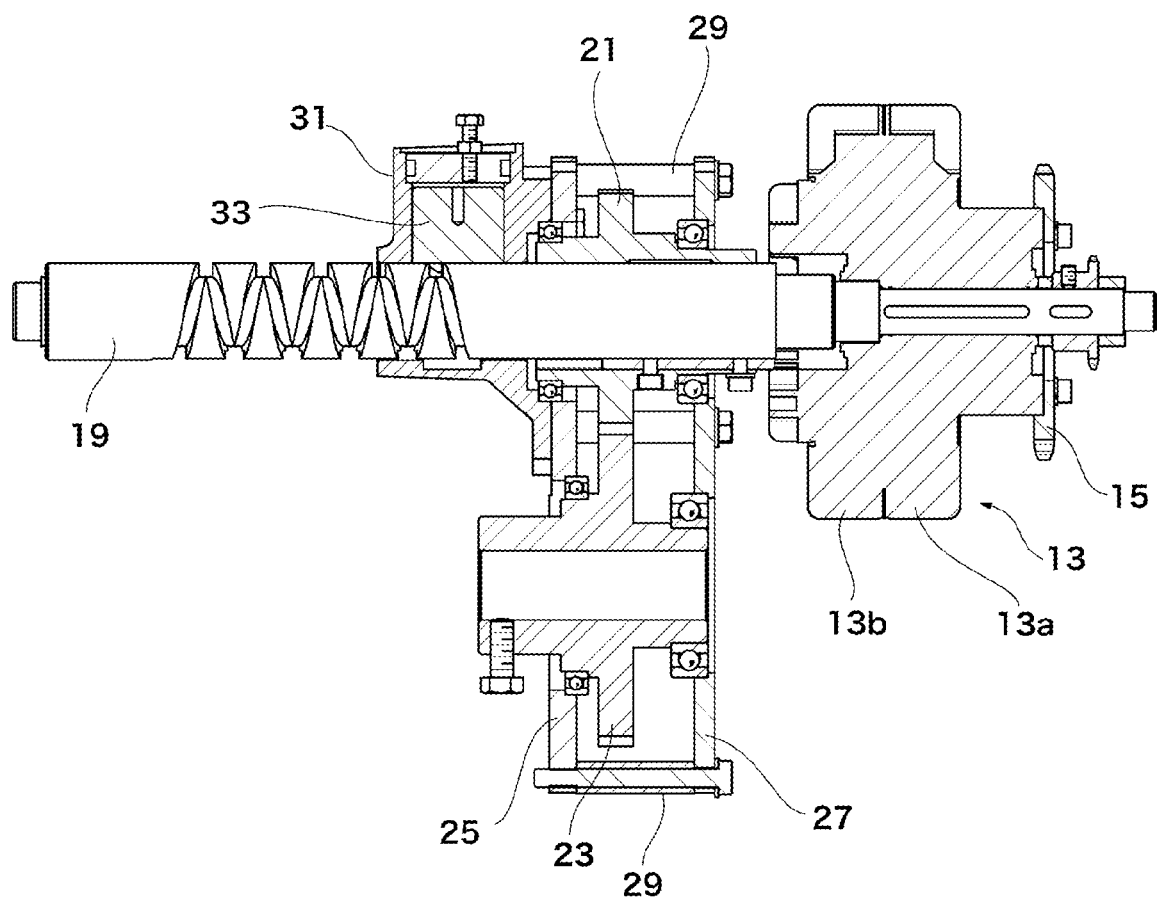
FIG. 5 a view showing the embodiment of the present invention, that is a longitudinal cross-section showing the construction of the principal part of the pole-and-line fishing device.

An embodiment of the present invention will be described hereinbelow with reference to FIG. 1 to FIG. 18. For convenience, any part having the same function is identified by the same reference numeral and its explanation is omitted. A pole-and-line fishing device according to the present invention is installed onboard a fishing boat. As shown in FIG. 1 to FIG. 3, there is a mount base 1, and a turntable 3 is mounted on the mount base 1. On the turntable 3 is attached a body case 5. A drive motor 7 is arranged in the body case 5, and a speed reducer 9 is connected to the drive motor 7. A sprocket (not shown) is secured to an output shaft, not shown, of the speed reducer 9.

The turntable 3 includes an operation handle 4, and the overall device may be rotate by manipulating the operation handle 4.

An electromagnetic clutch designed as a powder clutch 13 in this embodiment is arranged in the body case 5, above the drive motor 7. The powder clutch 13 consists of a drive-side rotor 13a and a driven-side rotor 13b. A sprocket 15 (shown in FIG. 4) is secured to the drive-side rotor 13a. A chain 17 is wound between the sprocket 15 and another sprocket, not shown, on the side of the speed reducer 9, through which a driving force by the drive motor 7 is transmitted to a main shaft 35, via the powder clutch 13 and a spiral shaft 19. The spiral shaft 19 is secured to the driven-side rotor 13b. A spiral gear 21 is secured to the spiral shaft 19. As shown in FIG. 1, the leading end of the spiral shaft 19 is supported by a bearing 20.

The spiral shaft 19 provides a traverse action and cooperates with simultaneous rotation of the main shaft 35 to uniformly wind a fishline 41 around a rotary drum 37.

A main shaft gear 23 is arranged in the body case 5 aside from the spiral shaft 19, and the main shaft gear 23 is in mesh with the spiral gear 21. The spiral gear 21 and the main shaft gear 23 are arranged to be interposed between a pair of gear plates 25, 27. A pair of the gear plates 25, 27 are fastened and fixed by four sets of fasteners 29.

A claw holder 31 is secured to the gear plate 25, and a spiral claw 33 is arranged in the claw holder 31. The spiral claw 33 is screwed into the spiral shaft 19.

The main shaft 35 is secured coaxially to the main shaft gear 23, and the rotary drum 37 is secured to the leading end (the right end in FIG. 1) of the main shaft 35. The base end (the left end in FIG. 1) of the main shaft 35 extends through the body case 35 and is supported by a shaft-supporting pipe 39 secured to the body case 5. In like manner, another shaft-supporting pipe 40 is secured to a through-hole portion of the body case 5 at the side of the leading end of the main shaft 35, for supporting the main shaft 35. The fishline 41 is wound around the rotary drum 37, and a fishing weel, not shown, such as fishhook for catching a tunny is connected to the leading end of the fishline 41. The main shaft 35 includes an encoder 45 attached to an encoder bracket 43. A reference numeral 47 denotes an encoder chain. When a torque is transmitted through the powder clutch 13, the sprocket 15 will rotate together with the spiral shaft 19, so that a driving force is transmitted to the encoder 45 via the encoder chain 47.

With regard to the powder clutch 13, fine powder (fine iron powder) is filled between the drive-side rotor 13a and the driven-side rotor 13b. The drive-side rotor 13a and the driven-side rotor 13b may be magnetized externally by an electromagnet. While the drive-side rotor 13a and the driven-side rotor 13b have not yet been magnetized, there is a gap between the drive-side rotor 13a and the driven-side rotor 13b, thereby transmitting no power. On the contrary, once the drive-side rotor 13a and the driven-side rotor 13b are magnetized, the powder (fine iron powder) is absorbed to the gap between the drive-side rotor 13a and the driven-side rotor 13b, which is filled up between the drive-side rotor 13a and the driven-side rotor 13b, thereby allowing power transmission.

It is noted that the powder clutch 13 is shown merely as an example of an electronic clutch, which is not limited thereto.

The encoder 45 is to detect the rotation speed and the rotation direction of the rotary drum 37.

Figure 6:
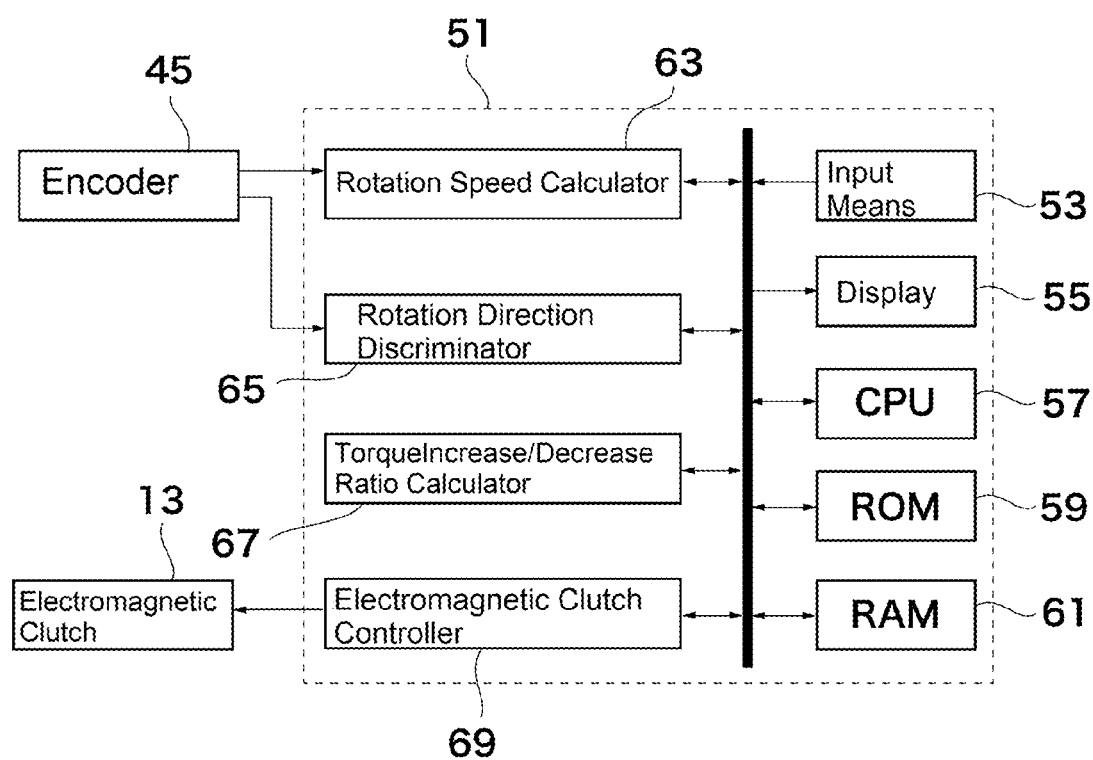
FIG. 6 a view showing the embodiment of the present invention, that is a functional block diagram showing the construction of a control unit of the pole-and-line fishing device.

As shown in FIG. 6, there is provided a control unit 51. The control unit 51 includes input means 53, a display 55, a CPU 57, a ROM 59, a RAM 61, a rotation speed calculator 63, a rotation direction discriminator 65, a torque increase/decrease rate calculator 67, an electromagnetic clutch controller 69, etc. The rotation speed calculator 63 will calculate rotation speed of the rotary drum 37 based on a signal from the encoder 45. The rotation direction discriminator 65 will discriminate direction of rotation (winding/unwinding direction) of the rotary drum 37 based on a signal from the encoder 45. The torque increase/decrease rate calculator 67 will calculate a radio of increase/decrease of the winding torque during the reverse torque operation, based on the torque (Winding Force 2) at the time when the rotary drum 37 begins to rotate reverse in the unwinding direction, the preset maximum torque (Winding Force 3) and Winding Force 3 Reference Rotation Speed at the time when the torque reaches the preset maximum torque (Winding Force 3). The electromagnetic clutch controller 69 will control the winding torque by the powder clutch 13 in any of the operation modes. For example, it will control the powder clutch 13 based on the ratio of increase/decrease of the winding torque, which is calculated by the torque increase/decrease rate calculator 67, during the reverse torque operation.

Figure 7:
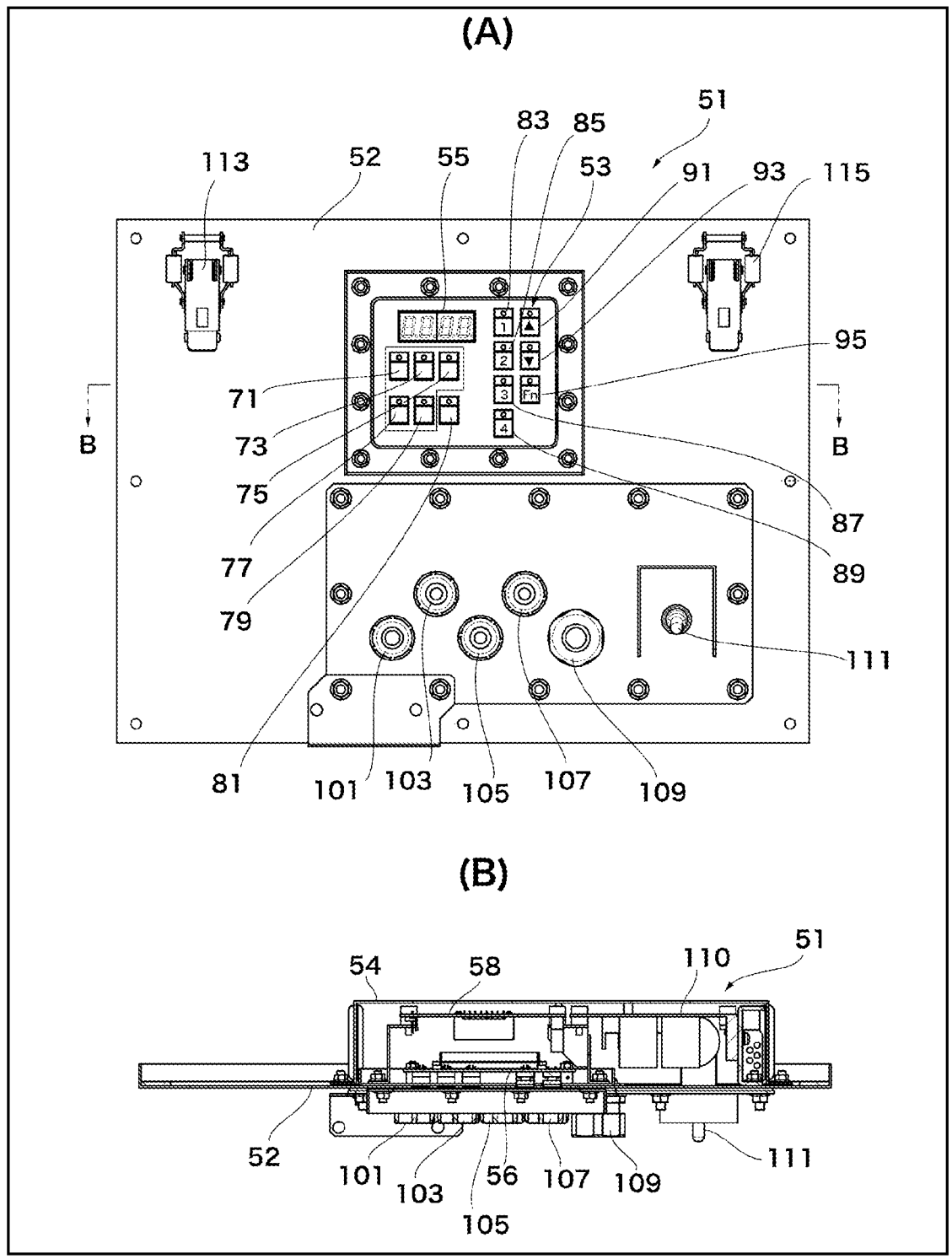
FIG. 7 a view showing the embodiment of the present invention, comprising a front view (A) showing the construction of a front panel of the pole-and-line fishing device and a cross-section (B) taken along B-B line in (A).

The input means 53 and the display 55 are realized on a front panel 52 shown in FIG. 7. The construction of the input means 53 will be described first. There are a Winding Force 1 setting key 71, a Winding Force 2 setting key 73, a Winding Force 3 setting key 75, a winding speed setting key 77 and an unwinding speed setting key 79. A water depth key 81 is arranged beneath the Winding Force 3 setting key 75. Depression of the water depth key 81 will switch a display mode of the display 55 to a water depth display. When the water depth key 81 is depressed while the device is not in operation, the preset value is returned to "o". There are also arranged preset keys 83, 85, 87, 89. Also arranged are count keys 91, 93 for counting up/down of the respective set values. Also arranged is a function key 95 for use in the various setting modes. The preset values for Winding Force 1, Winding Force 2 and Winding Force 3, as well as the winding/unwinding speeds to be described later, may be input in advance by operation of the preset keys 86, 85, 87, 89, which may be designated by one-touch operation to conform with the situations. The above-described preset values may be digitally input from "0" to "100" by the count keys 91, 93.

The display 55 will display the respective preset values and the water depth. The display mode may be changed by operation of the Winding Force 1 setting key 71, the Winding Force 2 setting key 73, the Winding Force 3 setting key 75, the winding speed setting key 77, the unwinding speed setting key 79 and the water depth key 81.

The front panel 52 is covered by a back cover 54 with a packing, for example, not shown, to form a sealing structure.

As shown in FIG. 7, external equipment connecting terminals 101, 103, 105, 107 are arranged beneath the input means 53 and the display 55, and a press-button unit 121 (shown in FIG. 8), a remote control unit 131 (shown in FIG. 8), a foot braking unit (not shown), a discharging unit (not shown), etc. are connected to the external equipment connecting terminals 101, 103, 105, 107. Also arranged is a power source connector 109, and a power line is connected to the power source connector 109. Also arranged is a main switch 111.

In FIG. 7, a reference numeral 56 denotes a display substrate, 58 a CPU substrate, 110 a power substrate, and 113, 115 draw latches with lock mechanism.

Figure 8:
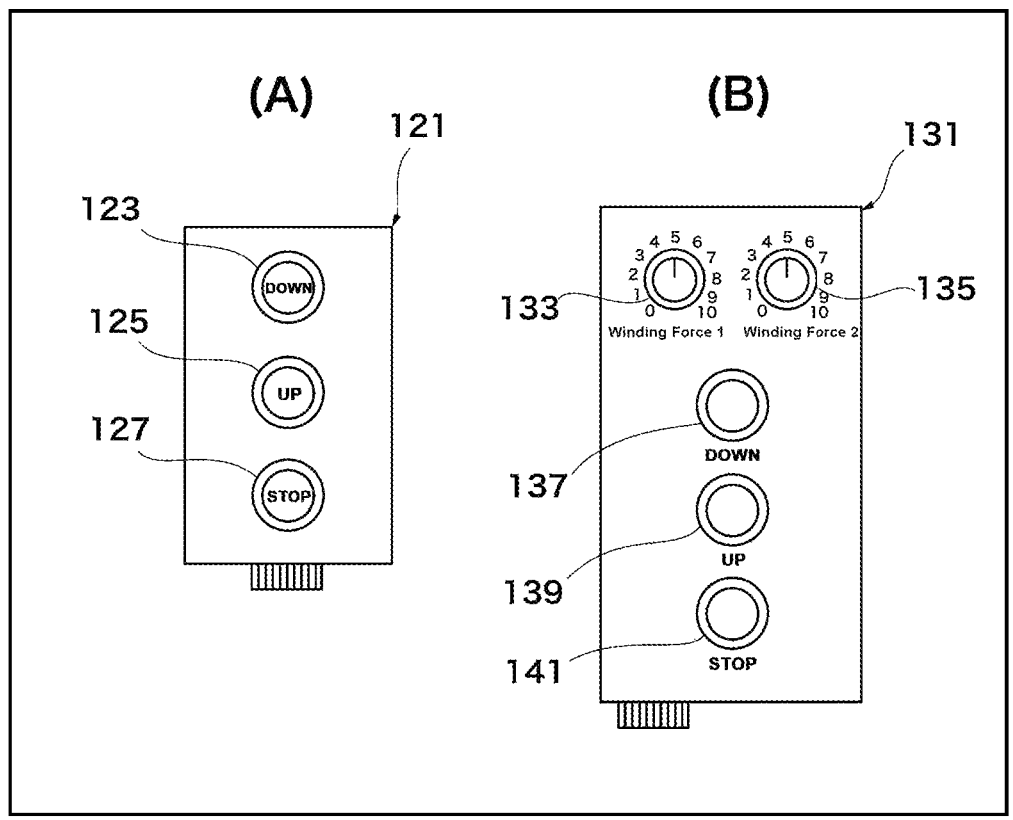
FIG. 8 a view showing the embodiment of the present invention, comprising a front view (A) showing the construction of an external press button and a front view (B) showing the construction of a remote control panel.

As shown in FIG. 8, there is the press button unit 121, and the press button unit 121 includes a DOWN button 123, an UP button 125 and a STOP button 127. Depression of the DOWN button 123 will create the unwinding condition wherein the fishline 41 is wound off at the unwinding speed determined by the unwinding speed setting key 79. On the contrary, depression of the UP button 125 will create the winding condition wherein the fishline 41 is wound up with the torque determined by the Winding Force 1 setting key 71, the Winding Force 2 setting key 73, the Winding Force 3 setting key 75, and at the winding speed determined by the winding speed setting key 77. Depression of the STOP button 127 will suspend the operation.

The remote control unit 131 is arranged as an option. The remote control unit 131 includes a Winding Force 1 setting dial 133, a Winding Force 2 setting dial 135, a DOWN button 137, an UP button 139 and a STOP button 141.

Next, the operation modes will be described. The operation modes include Operation Mode 1 (MR400), Operation Mode 2 (MR-250) and Operation Mode 3 (MR-2). Operation Mode 1 (MR400) has been set at the time of factory shipment.

Operation Mode 1 (MR-400) is an operation mode wherein the normal operation is switched suitably to the reverse torque operation. The normal operation provides the winding operation with Winding Force 1, whereas the reverse torque operation provides another operation mode wherein the torque is controlled to be increased/decreased depending upon the increase/decrease of the reverse rotation speed of the rotary drum, when it is rotating reverse in the unwinding direction. This operation mode provides a control for preventing the line stack of the fishline by increasing the torque, when it is pulled with a strong force. During this Operation Mode 1 (MR-400), as far as the rotary drum 37 is rotating forward in the winding direction with a small load being applied thereto, the winding operation is carried out with the winding torque, that is the preset Winding Force 1. However, when the load increases so that the rotation speed of the rotary drum 37 is lowered strikingly or it turns to rotate reverse, the device is switched to the reverse torque operation. In the initial stage of the reverse torque operation, the torque may be switched to Winding Force 2 that is smaller than Winding Force 1. Then, it executes the torque increase/decrease control depending upon the increase/decrease in the reverse rotation in the unwinding direction of the rotary drum 37. At this time, the ratio of increase/decrease of the winding torque is determined by the preset Winding Force 2, the preset maximum torque (Winding Force 3) and Winding Force 3 Reference Rotation Speed at the time when the torque reaches the preset maximum torque (Winding Force 3), which will be described with reference to FIG. 14 to FIG. 16.

Operation Mode 2 (MR-250) is an operation mode wherein the winding torque is automatically changed depending upon direction of rotation of the rotary drum 37. While the rotary drum 37 is rotating forward in the winding direction, the device is driven with the winding torque, that is the present Winding Force 1, whereas, while the rotary drum 37 rotates reverse in the unwinding direction, the device is driven with the winding torque, that is the preset Winding Force 2 (see FIG. 17).

Figure 17:
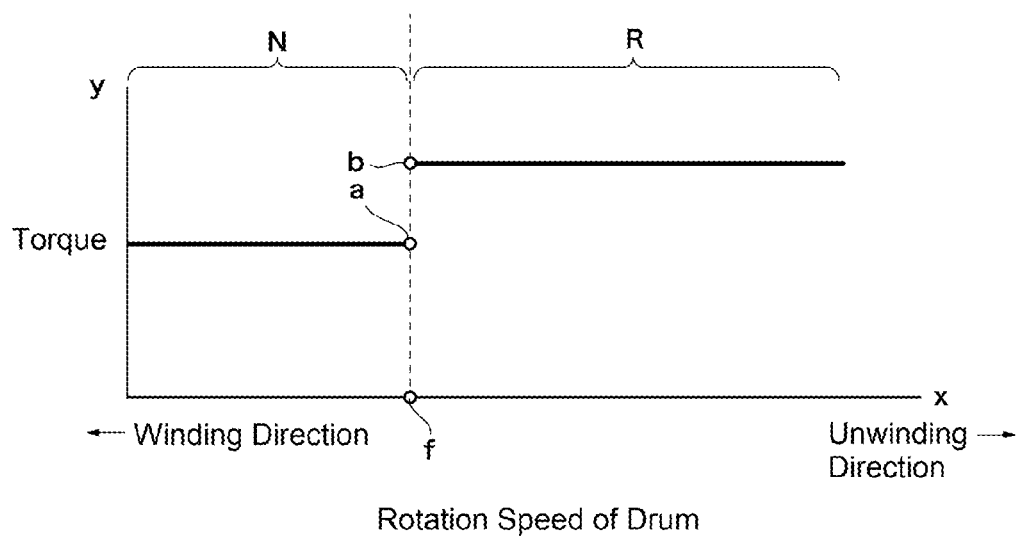
FIG. 17 a view showing the embodiment of the present invention, that is a characteristic diagram showing the appearance of the operation mode 2.

In the case of FIG. 17, Winding Force 2 is set to be greater than Winding Force 1.

Figure 18:
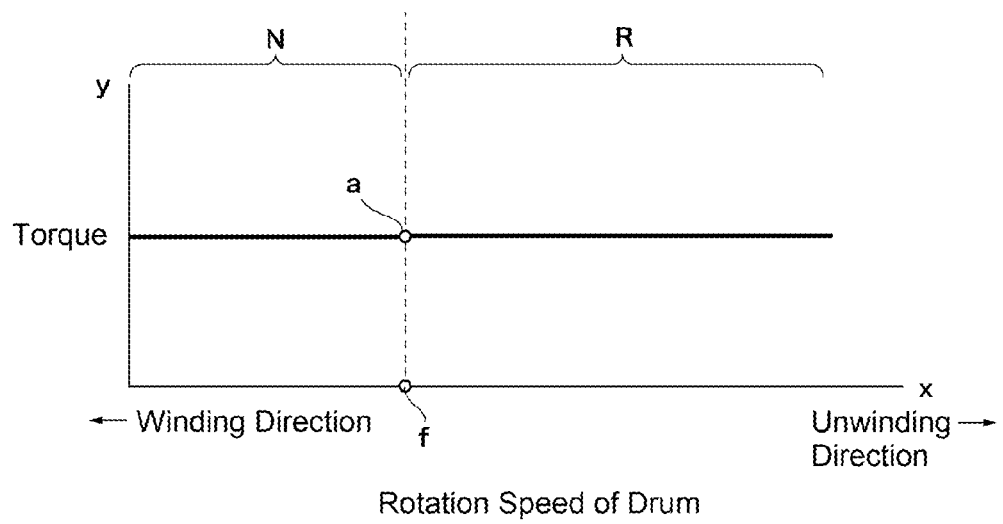
FIG. 18 a view showing the embodiment of the present invention, that is a characteristic diagram showing the appearance of the operation mode 3.

In Operation Mode 3 (MR-2), the device is driven always with the winding torque, that is the preset Winding Force 1 (see FIG. 18).

The meanings of Winding Force 1, Winding Force 2 and Winding Force 3 in the respective operation modes will be summarized in the following Table 1.

[Table 1]

| Operation Mode | Winding Force 1 | Winding Force 2 | Winding Force 3 |
|---|---|---|---|
| Operation Mode 3 (MR-2) | Torque applicable to all rotation for normal operation and reverse torque operation | - | - |
| Operation Mode 2 (MR-250) | Torque applicable to forward rotation in normal operation | Torque applicable to reverse rotation in reverse torque operation | - |
| Operation Mode 1 (MR-400) | Torque applicable to forward rotation in normal operation | Torque applicable to switch timing to reverse rotation in reverse torque operation | Maximum torque control value applicable to torque increase ratio and reverse rotation when reverse rotation speed increases |

As shown in Table 1, Winding Force 1, Winding Force 2 and Winding Force 3 are defined in the respective operation modes to involve predetermined contents.

Figure 9:
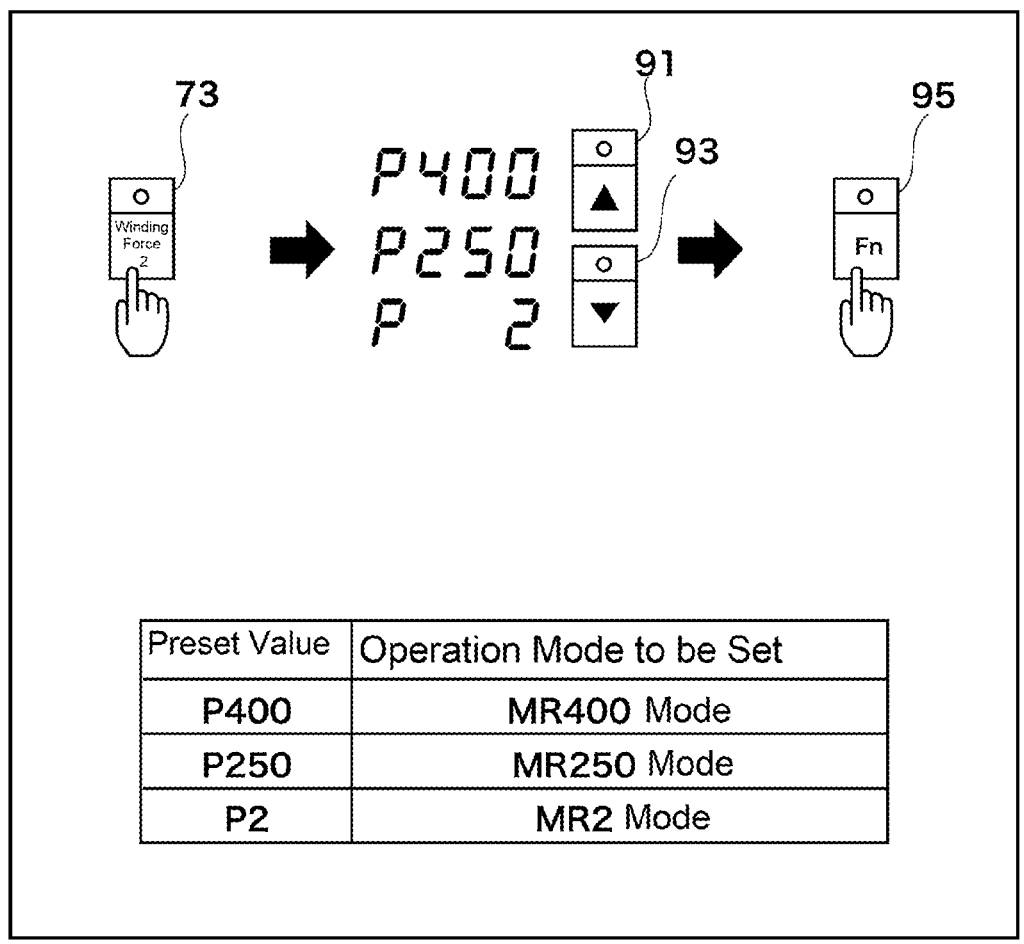
FIG. 9 a view showing the embodiment of the present invention, that is a view for explaining the manner how to determine the operation mode.

As shown in FIG. 9, the operation mode may be selected by using the Winding Force 2 setting key 73, the count keys 91, 93 and the function key 95.

First, the main switch 111 is operated, while the Winding Force 2 setting key 73 is kept being depressed, to supply power to the device. By this, one of the above-described three kinds of the operation modes is displayed in the display 55. When the count key 91, 93 is operated in this state to select a desired one of the operation modes. Lastly, the function key 95 is depressed for the final decision.

Next, the setting of the switch timing of the operation modes in Operation Mode 1 will be described with reference to FIG. 10. Four values have been prepared for the switch timings. More specifically, the preset value "−1" means that the device is switched to the reverse torque operation when the speed is lowered to −1 rpm, the preset value "0" means that the device is switched to the reverse torque operation when the speed is lowered to 0 rpm, the preset value "2" means that the device is switched to the reverse torque operation when the speed is lowered to 2 rpm, and the preset value "10" means that the device is switched to the reverse torque operation when the speed is lowered to 10 rpm.

More specifically, in the case of "−1 rpm", the device is switched to the reverse torque operation at the time when the rotary drum 37 which has been rotating in the winding direction is pulled by a tunny caught on the fishhook so that it turns to rotate reverse in the unwinding direction and its rotation speed becomes 1 rpm, in the case of "0 rpm", the device is switched to the reverse torque operation at the time when the rotary drum 37 comes to a stop, in the case of "2 rpm", the device is switched to the reverse torque operation at the time when the rotary drum 37 is decelerated to 2 rpm in the winding direction, and in the case of "10 rpm", the device is switched to the reverse torque operation at the time when the rotary drum 37 is decelerated to 10 rpm in the winding direction.

The value "−1" has been set at the time of factory shipment.

Figure 10:
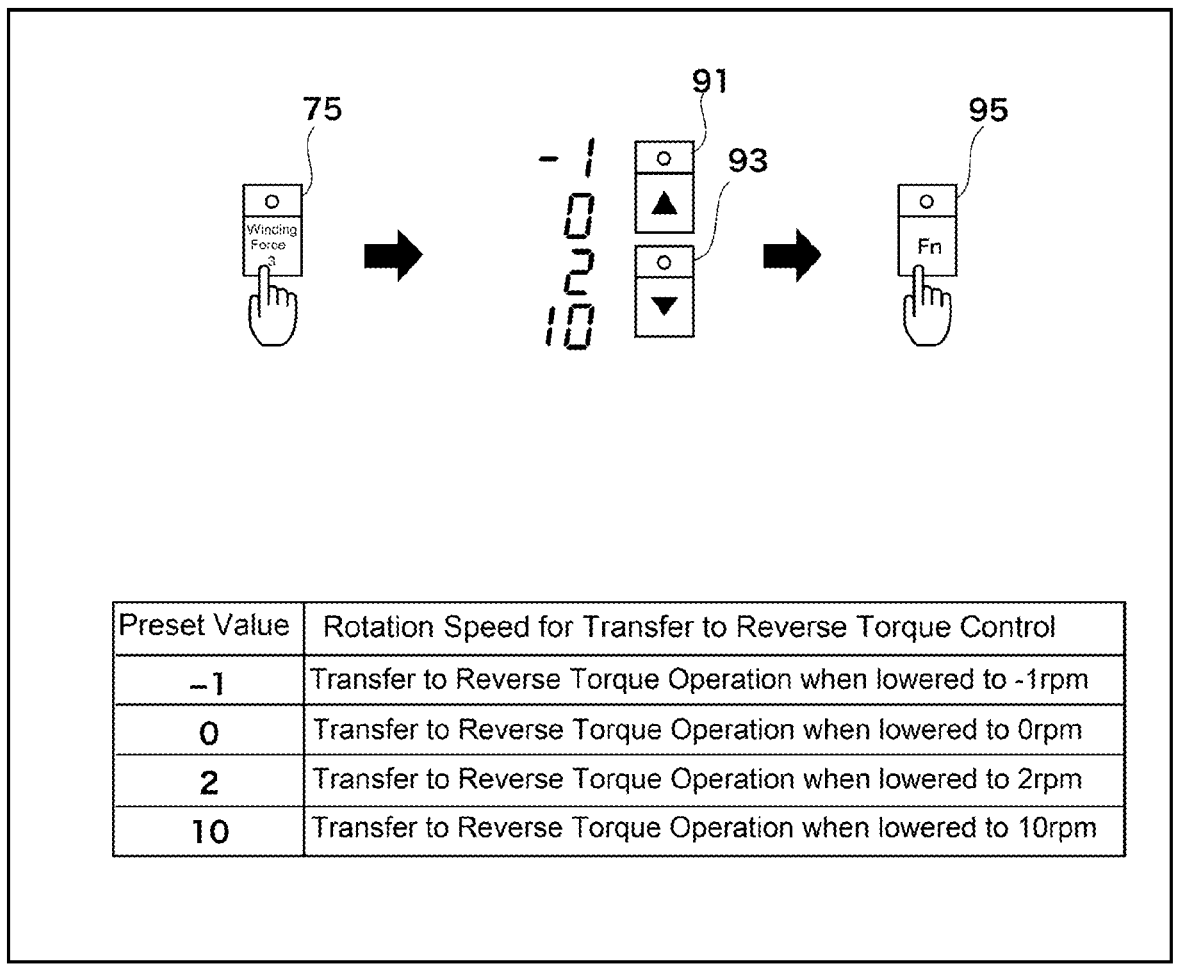
FIG. 10 a view showing the embodiment of the present invention, that is a view for explaining the manner how to determine the timing at which the initial winding operation is switched to the reverse torque operation.

As shown in FIG. 10, the main switch 111 is operated, while the Winding Force 3 setting key 73 is kept being depressed, to supply power to the device. By this, one of the above-described four kinds of the timings is displayed in the display 55. When the count key 91, 93 is operated in this state to select a desired one of the timings. Lastly, the function key 95 is depressed for the final decision.

Next, the setting of the increase/decrease ratio of the winding torque in the reverse torque operation will be described with reference to FIG. 11. This may be set by setting Winding Force 2, Winding Force 3 and the rotation speed of the rotary drum rotating in the unwinding direction at which the torque reaches Winding Force 3 (Winding Force 3 Reference Rotation Speed).

Four values have been prepared for Winding Force 3 Reference Rotation Speed. More specifically, the preset value "1" means "−100 rpm", the preset value "2" means "−150 rpm", the preset value "3" means "−200 rpm" and the preset value "4" means "−250 rpm", these four values being stored. The value "1" has been set at the time of factory shipment.

Figure 11:
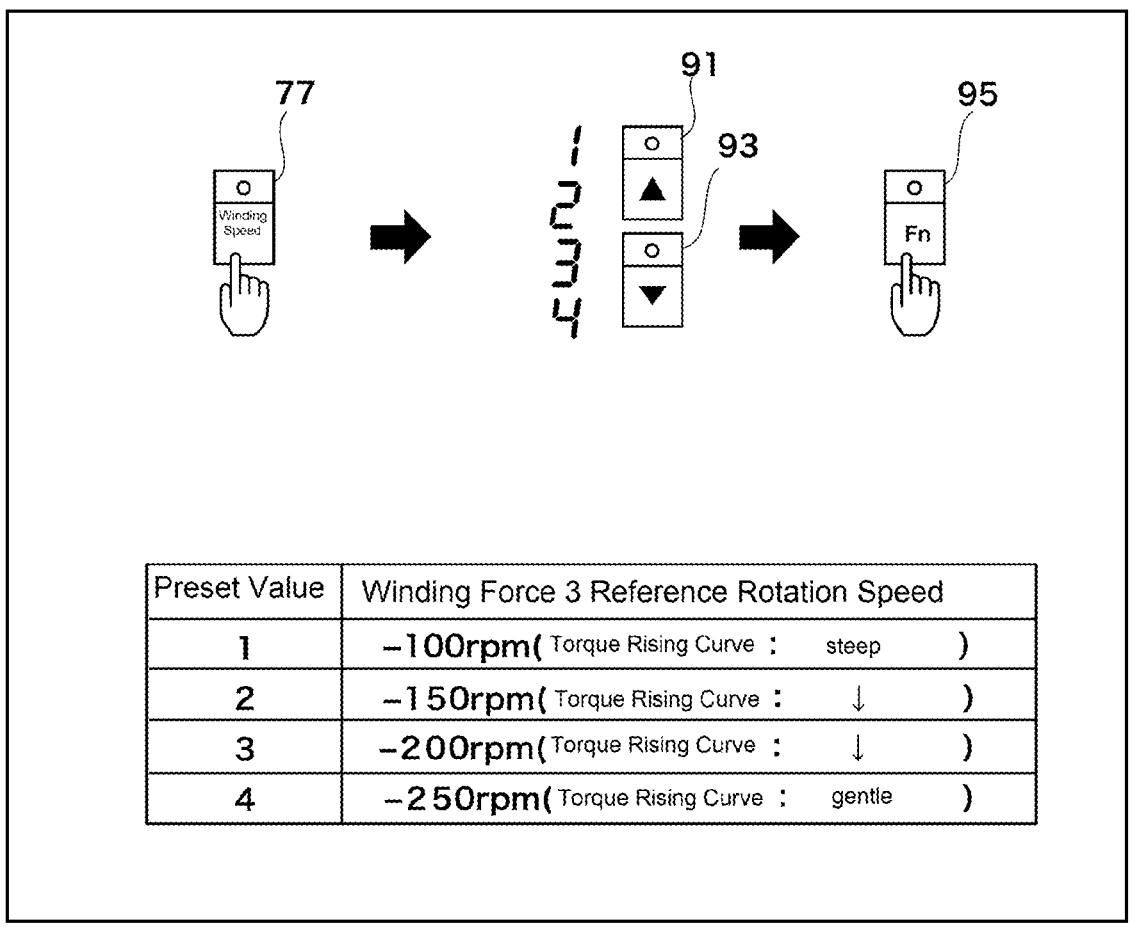
FIG. 11 a view showing the embodiment of the present invention, that is a view for explaining the manner how to determine the ratio of increase/decrease of the winding torque during the reverse torque operation.

The "−100 rpm" means that the rotary drum 37 is rotating reverse in the unwinding direction at a speed of 100 rpm while being pulled by a tunny, −150 rpm" means the reverse rotation in the unwinding direction at 150 rpm, "−200 rpm" means the reverse rotation in the unwinding direction at 200 rpm and "−250 rpm" means the reverse rotation in the unwinding direction at 250 rpm, As shown in FIG. 11, the main switch 111 is operated, while the winding speed key 77 is kept being depressed, to supply power to the device. By this, one of the above-described four kinds of the rotation speeds is displayed in the display 55. When the count key 91, 93 is operated in this state to select a desired one of the rotation speeds. Lastly, the function key 95 is depressed for the final decision.

The preset will now be described. A preset value to be stored for Winding Force 1, Winding Force 2, Winding Force 3, the winding speed and the unwinding speed will be designated by operating the corresponding preset key, which is input by operating the count key 91 or the count key 93. As described before, each preset value of Winding Force 1, Winding Force 2, Winding Force 3, the winding speed and the unwinding speed will be determined in advance and stored. For example, Preset 1 designates that Winding Force 1 is "70", Winding Force 2 is "30", Winding Force 3 is "50", the winding speed is "80" and the unwinding speed is "100", which may be stored by operation of the preset key 83. In like manner, other sets of the five preset values are stored as Preset 2, 3 and 4 by operating the preset keys 85, 87, 89, respectively. The preset value of the winding speed will determine an output voltage of the drive motor 7. By varying the preset value of the winding speed, rotation of the drive motor 7 will become faster or slower. At the time of winding, the winding operation is carried out by a combination of the rotation of the drive motor 7 and the output to the power clutch 13. On the other hand, at the time of unwinding, because the drive motor 7 does not rotate, the fishline 41 is wound off in response to the load from the outside. Accordingly, in order to obtain the preset value (the rotation speed) of the unwinding operation while rotating in the unwinding direction, the device is controlled such that the powder clutch 13 becomes strengthened in case of high rotation speed, whereas the powder clutch 13 becomes weakened in case of low rotation speed.

The specific preset values stored in the above-described manner may be invoked by operating the preset key 83, 85, 87, 89 depending upon the situations such as oceanographic conditions to carry out the reverse torque operation. Because the four sets of the preset values are stored, any one of Presets 1 to 4 may be designated depending upon the conditions such as oceanographic conditions. Accordingly, the on-board working may be done in quick response to hour-to-hour changes of fishing gears, baits, oceanographic conditions, etc. The preset keys 83, 85, 87, 89 will be operable also for achieving the unwinding operation, the winding operation and the stop operation.

The preset mode may be switched to another during the winding operation, the unwinding operation and the stop operation. The switch timing may involve, for example, (a) at the initial stage of the fishing procedure, that is at the time when throwing a bait after finding a tunny, (b) at the initial to middle stage of the fishing procedure, that is at the time when the caught tunny begins swimming around, and (c) at the later stage of the fishing procedure, that is at the time when the caught tunny becomes exhausted. At the respective stages of the fishing procedure, the device may be switched to any one of the preset values by one-touch operation (FIG. 12).

Based on the above-described construction, its function will now be described.

First, with reference to FIG. 12 and FIG. 13, the field-work procedure for the pole-and-line tunny fishing, especially the automatic control in the field-work procedure will now be described.

Figure 12:
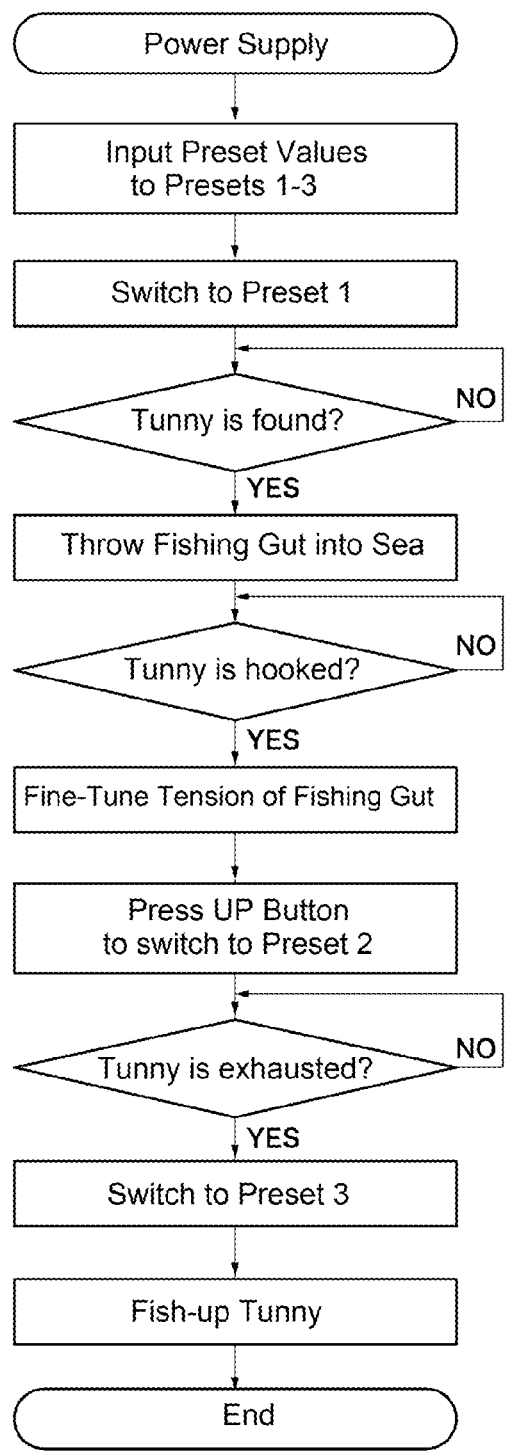
FIG. 12 a view showing the embodiment of the present invention, that is a flowchart for explaining the operational procedure to be done by a field operator.
Figure 13:
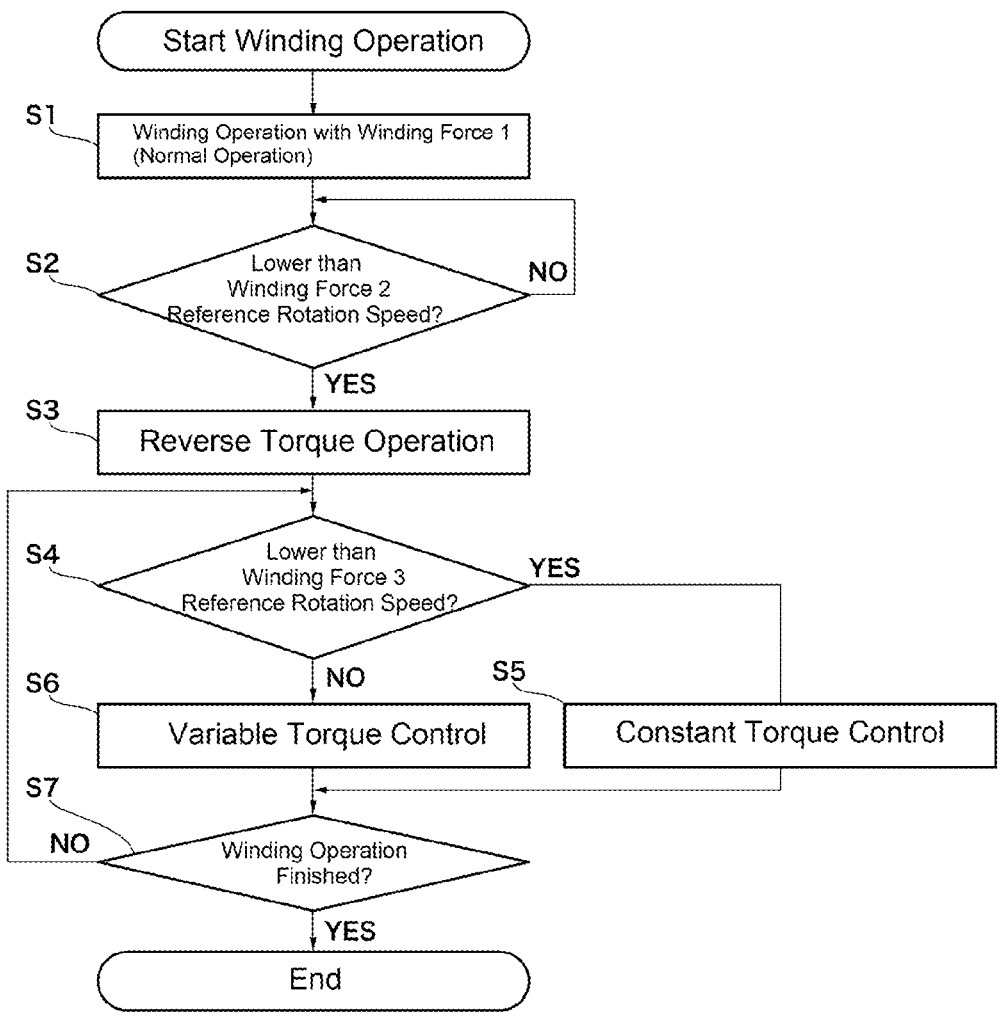
FIG. 13 a view showing the embodiment of the present invention, that is a flowchart showing a part of the operation shown in FIG. 11, an information processing to be automatically controlled.

FIG. 12 is a flowchart showing the field-work procedure for the pole-and-line tunny fishing, which starts with supplying power. The machine is still at a standstill. Then, preset values are input to Presets 1 to 3. Then, Preset 1 is designated. Next, it is judged whether a tunny is found. When a field worker finds a tunny, a fishline 41 is thrown into the sea. And, the DOWN button 123 in the press button unit 121 is depressed and operated to unwind the fishline 41.

Thereafter, it is judged whether the tunny is hooked. When the field worker judges that the tunny is hooked, the tension of the fishline 41 is adjusted finely. Then, the UP button 125 in the press button unit 121 is depressed and operated to switch the preset mode to Preset 2. By this, the machine becomes ready for the automatically controlled winging operation. Next, the field worker judges whether the tunny becomes exhausted and, if so judged, the preset mode is switched to Preset 3. Then, the tunny is fished up so that a series of procedure has been finished.

The above-described automatic control will now be described with reference to FIG. 13. As described above, the machine will become ready for the winding operation when the UP button 125 is depressed and operated by the field worker. At first, the winding operation is carried out with the preset "Winding Force 1" (step S1), which is then transferred to a step S2 where it is discriminated whether rotation speed of the rotary drum 37 reaches the preset Winding Force 2 Reference Rotation Speed. When discriminating that it reaches Winding Force 2 Reference Rotation Speed, the procedure is transferred to a step S3 for performing the reverse torque operation. On the contrary, when it is discriminated that it still does not reach Winding Force 2 Reference Rotation Speed, the winding operation with Winding Force 1 will continue.

Then, the procedure is transferred to a step S4 where it is discriminated whether rotation speed of the rotary drum 37 reaches the preset Winding Force 3 Reference Rotation Speed. When discriminating that it reaches Winding Force 3 Reference Rotation Speed, the procedure is transferred to the winding operation with Winding Force 3 (step S5). On the contrary, when it is discriminated that it still does not reach, the reverse torque operation will continue (step S6). The reverse torque operation will be described later.

Then, the procedure is transferred to a step S7 where it is discriminated whether the winding operation is finished. When discriminating the finish, the procedure is terminated. On the contrary, when discriminating no finish, the procedure is returned to the step S4.

Next, specific examples of the procedure shown in FIG. 13 will now be described with reference to FIG. 14 to FIG. 16.

Figure 14:
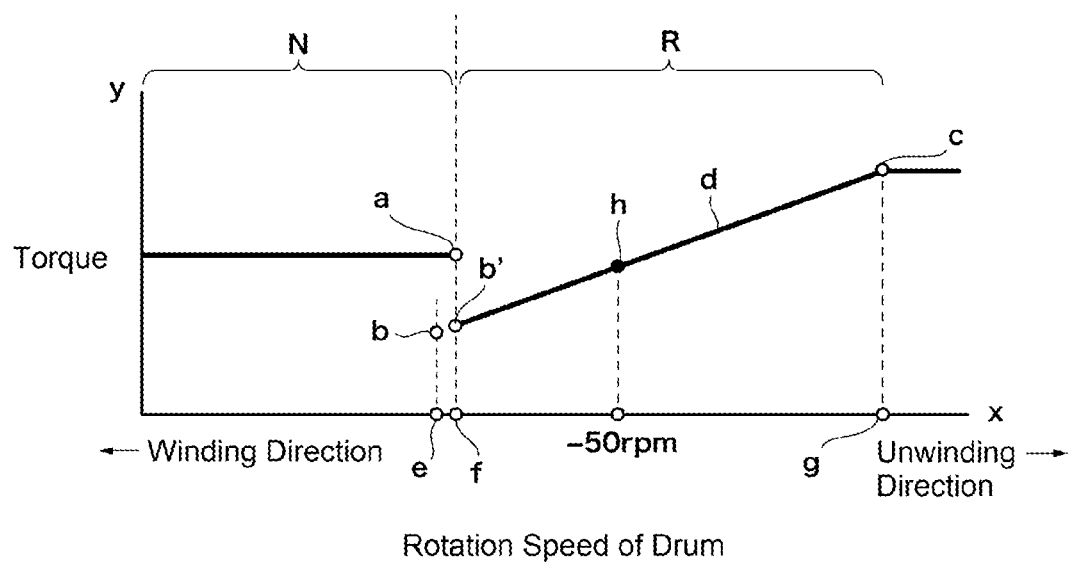
FIG. 14 a view showing the embodiment of the present invention, that is a characteristic diagram showing the appearance when the timing of switching from the initial winding operation to the reverse torque operation is determined to be "−1 rpm" in Operation Mode 1.

First, with reference to FIG. 14, the case wherein "Operation Mode 1" is selected and Winding Force 2 Reference Rotation Speed is set to "−1 rpm", which means that the normal operation region N should be switched to the reverse torque operation region R when the rotary drum 37 begins rotating reverse in the unwinding direction at "1 rpm".

FIG. 14 is a characteristic diagram showing the change of rotation speed of the winding torque, wherein the horizontal axis x shows the actual rotation speed of the winding drum 37 and the vertical axis y shows the winding torque. In this figure, "a" denotes the preset value of Winding Force 1, "b" the preset value of Winding Force 2, "c" the preset value of Winding Force 3 and "d" the torque rising curve. "e" denotes Winding Force 2 Reference Rotation Speed, which is fixed to "0 rpm" in this example. "f" denotes the operation region switch point, which is set to "−1 rpm" in this example. "g" shows Winding Force 3 Reference Rotation Speed.

In FIG. 14, the initial winding operation is carried out with Winding Force 1. Then, as the load increases by being pulled by a tunny caught on the fishhook, the rotation speed of the rotary drum 37 in the winding direction will be lowered to "0" ("e" point) and then to "−1 rpm" ("f" point), which means that it turns to rotate reverse in the unwinding direction at 1 rpm. At this time, the operation is switched to the reverse torque operation. In this region R, the initial torque at the time when the operation is switched to the reverse torque operation, that is "Winding Force 2 (b')", is smaller than Winding Force 1 (a). This will prevent the fishline 41 from being severed. During the reverse torque operation, while the rotary drum 37 is rotating in the unwinding direction because of the tunny's swimming to escape, according to the torque rising curve (d), the winding torque will be automatically increased with an increase of the reverse rotation speed, whereas the winding torque will be automatically decreased with a decrease of the reverse rotation speed.

More specifically, if the tunny should swim around at a high speed during the reverse rotation, there would arise a "backlash". To avoid this, when the rotation speed in the reverse direction increases to a high speed, the torque is controlled to be strengthened so as to prevent the fishline 41 from being unwound in a flash. In contrast, when the reverse rotation speed is lowered, the torque is controlled to be lowered. As such, the device may be controlled in quick response to the communication or fighting with the tunny or to the tunny's swimming around in every direction to escape. When the tunny becomes exhausted, the rotary drum 37 is returned to rotate forward in the winding direction for fishing up the tunny.

The ratio of increase/decrease of the winding torque is, as described before, determined from the torque (b) of the preset "Winging Force 2", the preset maximum torque (c) ("Winding Force 3") and "Winding Force 3 Reference Rotation Speed" (g) that is the rotation speed at the time when the winding force reaches Winding Force 3. More specifically, it is determined by the torque rising curve (d) between the torque (b') at the operation region switch point (f) and the torque of Winding Force 3 Reference Rotation Speed (g), that is the preset maximum torque (c). The torque rising curve (d) is shown linearly as a linear function between the rotation speed (x) of the rotary drum 37 and the output value (y) of the powder clutch 13. For example, when the actual rotation speed of the rotary drum 37 becomes x=−50 rpm in the unwinding direction, the winding force (y) of the rotary drum 37 will operate with the torque value (h) on the torque rising curve (d).

Then, the rotation speed of the rotary drum 37 reaches Winding Force 3 Reference Rotation Speed (g), the operation will become operable with the constant torque (c) of Winding Force 3.

The "backlash" will now be described.

The "backlash" means a phenomenon wherein the rotation speed of the rotary drum 37 is not in conformity with the unwinding of the fishline (fishing gut) so that the rotary drum 37 rotates by an inertial force, while the fishline is not unwound, thereby resulting in entanglement of the fishline in the rotary drum 37. When the tunny is swimming around at a high speed and with a large torque, the rotary drum 37 is caused to be rotated by a strong external force, which may result in a backlash. This will sometime cause a line slack wherein the fishline is unwound excessively, which may be a cause of entanglement of the fishline 41. Once the fishline is entangled, the worst, that is severance of the fishline may happen.

Next, with reference to FIG. 15, the case wherein "Operation Mode 1" is selected and the operation region switch point (f) is determined to be equal to Winding Force 2 Reference Rotation Speed will now be described. In this case, Winding Force 2 Reference Rotation Speed (e) is set to "0 rpm", meaning that the operation is switched to the reverse torque operation region (R) at the time when the rotation speed of the rotary drum 37 becomes "0 rpm".

Figure 15:
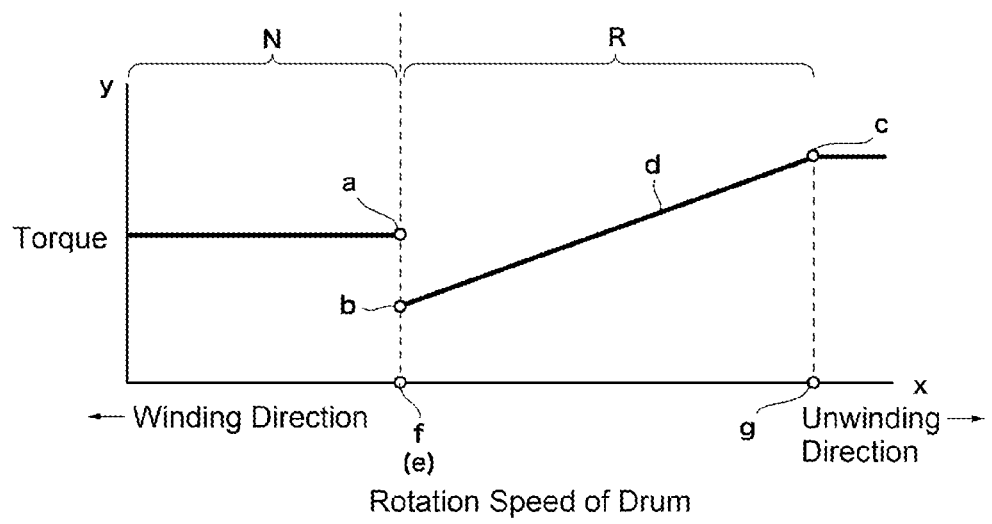
FIG. 15 a view showing the embodiment of the present invention, that is a characteristic diagram showing the appearance when the timing of switching from the initial winding operation to the reverse torque operation is determined to be "0 rpm" in Operation Mode 1.

In FIG. 15, the initial winding operation is carried out with Winding Force 1. Then, as the load increases by being pulled by a tunny caught on the fishhook, the forward rotation speed of the rotary drum 37 in the winding direction should be lowered to "0" ("e" point) or come to a stop. At this time, the operation is switched to the reverse torque operation.

The reverse torque operation will be the same as described above.

Figure 16:
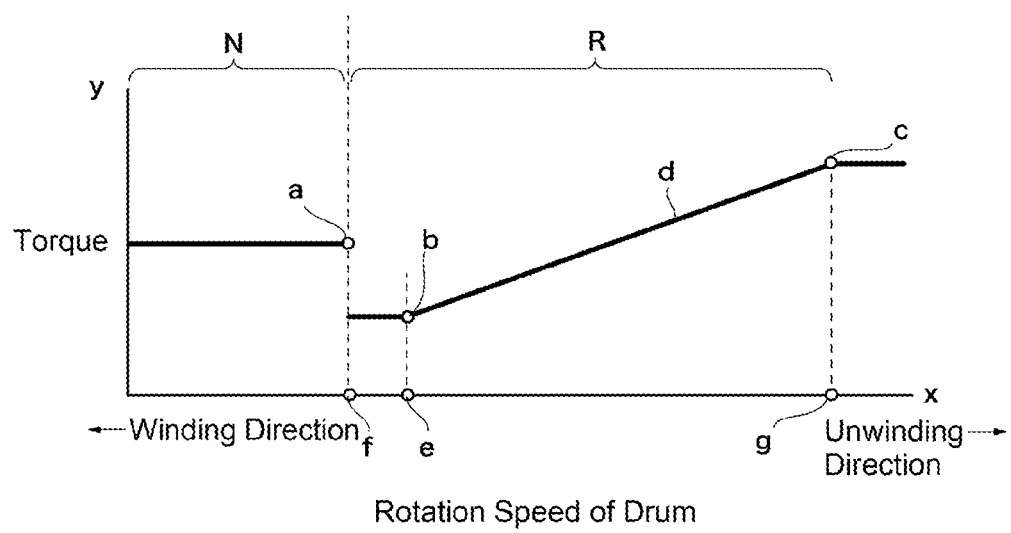
FIG. 16 a view showing the embodiment of the present invention, that is a characteristic diagram showing the appearance when the timing of switching from the initial winding operation to the reverse torque operation is determined to be "10 rpm" or "2 rpm" in Operation Mode 1.

Next, with reference to FIG. 16, the case wherein "Operation Mode 1" is selected and Winding Force 2 Reference Rotation Speed is set to "10 rpm or 2 rpm", which means that the operation is switched to the reverse torque operation at the time when the forward rotation speed of the rotary drum 37 in the winding direction becomes "10 rpm or 2 rpm" at the operation region switch point (f).

In FIG. 16, the initial winding operation is carried out with Winding Force 1 (a). Then, as the load increases by being pulled by a tunny caught on the fishhook, the forward rotation speed of the rotary drum 37 in the winding direction should be lowered to "10 rpm" or "2 rpm" in due course. At this time, the operation is switched to the reverse torque operation.

The reverse torque operation will be the same as described above.

Incidentally, as shown in FIG. 16, this case involves the winding operation with Winding Force 2 that is set to the torque (b), from the point (f) to the point (e).

Next, the case wherein "Operation Mode 2" is selected will be described with reference to FIG. 17.

FIG. 17 is also a characteristic diagram showing the change of rotation speed of the winding torque, wherein the horizontal axis x shows the actual rotation speed of the winding drum 37 and the vertical axis y shows the winding torque.

In FIG. 17, the initial winding operation is carried out with Winding Force 1 (a). Then, as the load increases by being pulled by a tunny caught on the fishhook, the forward rotation speed of the rotary drum 37 will be lowered to a stop, and when it turns to rotate reverse at the operation region switch point (f), the operation is switched to the winding operation with Winding Force 2 that is set to the torque (b). Operation Mode 2 is an operation mode to be designated, when the rotary drum 37 begins to rotate reverse in the unwinding direction with a big load (catch).

Next, the case wherein "Operation Mode 3" is selected will be described with reference to FIG. 18.

FIG. 18 is also a characteristic diagram showing the change of rotation speed of the winding torque, wherein the horizontal axis x shows the actual rotation speed of the winding drum 37 and the vertical axis y shows the winding torque.

Operation Mode 3 is the operation mode wherein the winding operation is carried out always with Winding Force 1 (a) regardless of forward rotation or reverse rotation of drum. In this case, Winding Force 2 and Winding Force 3 are not applicable. In this example, Winding Force 1 (a) is set to 0 rpm.

The above-described embodiments of the present invention may provide the following effects.

First, by selecting Operation Mode 1, the device becomes ready in quick response to movement of the tunny caught by the fishline. This may be achieved by executing such control that, when the rotary drum 37 is rotating reverse in the unwinding direction, the winding torque is automatically increased as the speed increases, whereas the winding torque is automatically decreased as the speed decreases. As a result, it is possible to prevent the fishline from being inadvertently severed.

By the above-described control, the tunny is exhausted by applying a load thereto, but the tunny may be hauled aboard before an excessive degree of load is applied thereto. In other words, the above-described control will restrict wild movement of the tunny, while allowing swimming within a certain extent. This will also prevent the fish meat from being burned.

Moreover, it is not necessary to use a thick fishline 41 which has been required to be used in the prior art, which will provide a bigger catch in fishing. For example, the present invention allows the use of a fishline 41 of No. 40 (1.050 mm outside diameter), Moreover, it is possible to select a switch timing from the normal operation to the reverse torque operation in Operation Mode 1, which makes it possible to designate a suitable switch timing for achieving a bigger catch in fishing.

More specifically, the control is carried out such that the rotation speed of the rotary drum is increased in the reverse rotation (in the unwinding direction) at a timing when a tunny is swimming away to escape, whereas the rotation speed of the rotary drum is increase in the forward rotation (in the winding direction) at a timing when the tunny is approaching, which will prevent severance and backlash of the fishline. As such, it is possible to set Winding Force 2 Reference Rotation Speed and the output torque corresponding thereto, which will enable fine-adjustment of the torque distribution at the time of switching to prevent the fishline from being inadvertently severed.

Moreover, it is possible to adjust the increase/decrease ratio of the winding torque in the reverse torque operation in Operation Mode 1, which will make it possible to set the optimum ratio for bigger success in fishing. This also makes it possible to increase the torque when being pulled with great power by the tunny caught by the fishhook, and also to provide a quick response when the tunny is return-swimming toward the boat, which will prevent the "line slack" of the fishline.

In the case of FIG. 14, the torque to be applied at the time immediately after the normal operation is switched to the reverse torque operation becomes Winding Force 2 that is smaller than the previous torque, Winding Force 1, which will defuse the torque to be applied at the time of switching to the reverse torque operation, thereby preventing the fishline 41 from being inadvertently severed.

In the case of FIG. 14, the above-described Winding Force 2 Reference Rotation Speed is a preset value for the reverse rotation in the unwinding direction, which will enable fine-adjustment of the torque distribution at the time of switching to prevent the fishline from being inadvertently severed.

In the case of FIG. 15, the above-described Winding Force 2 Reference Rotation Speed is "0 rpm", which will prevent the fishline from being inadvertently severed.

In the case of FIG. 16, the above-described Winding Force 2 Reference Rotation Speed is a preset value for the forward rotation in the winding direction, which will surely prevent severance of the fishline by the line slack.

Moreover, in accordance with the embodiment of the present invention, the rotation of the powder clutch 13 is transmitted via the spiral gear 21 and the main shaft gear 23 to the main shaft 35, which provides direct transmission of rotation.

Moreover, the overall fishing device is mounted on the turntable 3, which may be oriented in any directions by holding the operation handle 4.

It is noted that the present invention is not limited to the above-described embodiment. For example, regarding the setting of the torque of the rotary drum 37, Winding Force 2 may be set to be greater than Winding Force 1, in FIG. 14 to FIG. 16. In FIG. 17, Winding Force 2 may be set to be smaller than Winding Force 1.

The mechanical construction of the fishing device is not limited to the illustrated one. For example, the transmission of driving force may be achieved by any means including sprocket-chain arrangement, gears and other mechanism.

Moreover, the powder clutch is used as an electromagnetic clutch in the above-described embodiment, this is not limitative.

The construction shown in other parts will be only examples.

INDUSTRIAL APPLICABILITY

The present invention is suitable to pole-and-line fishing of a tunny and also applicable to fishing of a fish which provides so-called fighting when coughed, like a tunny.

REFERENCE SIGNS LIST 1 mount base
2 turntable
4 operating handle
5 body case
7 drive motor
9 speed reducer
13 powder clutch
13a drive-side rotor
13b driven-side rotor
15 sprocket
17 chain
19 spiral shaft
20 bearing
21 spiral gear
23 main shaft gear
25 gear plate
27 gear plate
29 fastener
31 claw holder
33 spiral claw
35 main shaft
37 rotary drum
39 shaft supporting pipe
40 shaft supporting pipe
41 fishline
43 encoder bracket
45 encoder
47 encoder chain
51 control unit
52 front panel
53 input means
54 back cover
55 display
56 substrate for display
57 CPU
58 substrate for CPU
59 ROM
61 RAM
63 rotation speed calculator
65 rotation direction discriminator
67 torque increase/decrease ration calculator
69 electromagnetic clutch controller
71 winding force 1 setting key
73 winding force 2 setting key
75 winding force 3 setting key
77 winding speed setting key
79 unwinding speed setting key
81 water depth key
83 preset key
85 preset key
87 preset key
89 preset key
91 count key
93 count key
95 function key
101 external equipment connecting terminal
103 external equipment connecting terminal
105 external equipment connecting terminal
107 external equipment connecting terminal
109 power source connector
110 substrate for power
111 main switch
113 dray latch with lock mechanism
115 dray latch with lock mechanism
121 press button unit
123 DOWN button
125 UP button
127 STOP button
131 remote controller
133 winding force 1 setting dial
135 winding force 2 setting dial
137 DOWN button
139 UP button
141 STOP button

The invention claimed is:

1. A pole-and-line fishing device comprising:
a rotary drum rotatable in a forward winding direction and a reverse unwinding direction, and having a fishline wound therearound;
a drive motor for driving the rotary drum;
an electromagnetic clutch arranged between the rotary drum and the drive motor, wherein rotation of the drive motor is transmitted to the rotary drum to rotate the rotary drum in the forward winding direction until a load reaches a transmission torque, and when the load exceeds the transmission torque, the rotary drum is allowed to rotate in the reverse unwinding direction;
an encoder for detecting direction and speed of rotation of the rotary drum; and
a control unit for controlling the electromagnetic clutch based on a signal from the encoder, the control unit capable of switching from a normal operation region to a reverse torque operation region, wherein:
in the reverse torque operation region, which is designated when a load is increased so that rotation speed of the rotary drum reaches a preset Winding Force 2 Reference Rotation Speed, a winding torque is set to Winding Force 2 Reference Rotation Speed determined in relation to a Winding Force 1, and the winding torque is increased or decreased in conformity to an increase or decrease of rotation speed of the rotary drum, the ratio of winding torque increase/decrease determined by a torque rising curve from a torque at an operation region switch point to a torque of Winding Force 3 Reference Rotation Speed that is a preset maximum torque, and the winding torque is switched to Winding Force 3 to perform a constant torque operation when rotation speed of the rotary drum reaches the Winding Force 3 Reference Rotation Speed.

2. The pole-and-line fishing device according to claim 1, wherein:
   the Winding Force 2 Reference Rotation Speed is a preset value for a reverse rotation in the unwinding direction, and
   a torque of Winding Force 2, to be applied immediately after normal operation is changed to the reverse torque operation, is determined to be smaller than a torque of Winding Force 1.

3. The pole-and-line fishing device according to claim 2, wherein the rotation of the electromagnetic clutch is transmitted through a gear to the rotary drum.

4. The pole-and-line fishing device according to claim 2, wherein the fishing device is rotatably mounted on a turntable.

5. The pole-and-line fishing device according to claim 3, wherein the fishing device is rotatably mounted on a turntable.

6. The pole-and-line fishing device according to claim 1, wherein the Winding Force 2 Reference Rotation Speed is "0 rpm."

7. The pole-and-line fishing device according to claim 6, wherein the rotation of the electromagnetic clutch is transmitted through a gear to the rotary drum.

8. The pole-and-line fishing device according to claim 6, wherein the fishing device is rotatably mounted on a turntable.

9. The pole-and-line fishing device according to claim 7, wherein the fishing device is rotatably mounted on a turntable.

10. The pole-and-line fishing device according to claim 1, wherein the Winding Force 2 Reference Rotation Speed is a preset value for rotation in the forward winding direction and the winding torque is fixed to Winding Force 2, after the operation is switched to the reverse torque control and until the rotary drum turns to rotate in the reverse unwinding direction.

11. The pole-and-line fishing device according to claim 10, wherein the rotation of the electromagnetic clutch is transmitted through a gear to the rotary drum.

12. The pole-and-line fishing device according to claim 10, wherein the fishing device is rotatably mounted on a turntable.

13. The pole-and-line fishing device according to claim 11, wherein the fishing device is rotatably mounted on a turntable.

14. The pole-and-line fishing device according to claim 1, wherein the rotation of the electromagnetic clutch is transmitted through a gear to the rotary drum.

15. The pole-and-line fishing device according to claim 14, wherein the fishing device is rotatably mounted on a turntable.

16. The pole-and-line fishing device according to claim 1, wherein the fishing device is rotatably mounted on a turntable.

* * * * *